United States Patent [19]

Harada et al.

[11] Patent Number: 5,019,770
[45] Date of Patent: May 28, 1991

[54] SWITCHING POWER SOURCE DEVICE HAVING ENERGY RECOVERY

[75] Inventors: Kosuke Harada; Hiroshi Sakamoto; Takazi Nakamizo, all of Fukuoka, Japan

[73] Assignees: Kyushu University; Nishimu Electronics Industries Co., Ltd., both of Fukuoka, Japan

[21] Appl. No.: 426,572

[22] Filed: Oct. 24, 1989

[30] Foreign Application Priority Data

Oct. 26, 1988 [JP] Japan .................. 63-270068

[51] Int. Cl.⁵ .......................... G05F 1/56; H02M 7/48
[52] U.S. Cl. .................................. 323/282; 323/290; 363/16; 363/132; 363/134
[58] Field of Search .................. 363/16, 17, 24–26, 363/95, 97, 98, 131, 132, 134; 323/282, 284, 285, 290

[56] References Cited

U.S. PATENT DOCUMENTS

| | | | |
|---|---|---|---|
| 4,268,898 | 5/1981 | Brown | 363/20 |
| 4,408,267 | 10/1983 | Pruitt | 363/17 |
| 4,709,323 | 11/1987 | Lien | 363/26 |
| 4,739,463 | 4/1988 | Barna et al. | 363/26 |

FOREIGN PATENT DOCUMENTS

| | | | |
|---|---|---|---|
| 0669341 | 7/1979 | U.S.S.R. | 323/290 |
| 0928326 | 5/1982 | U.S.S.R. | 363/17 |

*Primary Examiner*—Peter S. Wong
*Attorney, Agent, or Firm*—Kinney & Lange

[57] ABSTRACT

A switching power source comprising a pair of output terminals, a first switch element, a reactor and a filter which are connected to each other in series between one of the terminals of an input DC power source and one of the output terminals; a second switch element connected between a connecting node for the reactor and the filter and the other terminal of the input DC power source; and means for causing energy stored in the reactor to be fed back for regeneration to the input DC power source when the switch elements are turned off, wheein the switching power source is characterized by that the first and second switch elements are alternatively actuated for ON-OFF actions at a prescribed time ratio.

11 Claims, 4 Drawing Sheets

SWITCHING POWER SOURCE DEVICE HAVING ENERGY RECOVERY

BACKGROUND OF THE INVENTION (1) Field of the Invention

This invention relates to a switching power source device for supplying a desired AC/DC output by producing a pulse width-modulated waveform through ON-OFF control of switching elements serially connected to an input power source. The device eliminates high-frequency components of the pulse width-modulated waveform with a smoothing choke (hereinafter this operation will be referred to as "smoothing").

This invention particularly relates to a switching power source device which, in a system designed to control the output by alternatively switching a plurality of switching elements connected in pairs as in push-pull connection or bridge connection, precludes a current-/voltage surge induced as a consequence of the on/off control of the switching elements. This device can be efficiently utilized in an AC uninterruptable power source system, a battery charging system, a controller drive system for motors, a DC constant voltage power source system, etc.

(2) Description of the Prior Art

The switching power source device has the virtues of small size and high efficiency, and therefore, finds extensive utility as a power source device in many fields such as data processing systems. The power source devices having a relatively large power capacity, and the AC power source devices designed to derive a sine-wave AC output from a DC input power source, are among the power source devices of this principle. For those power source devices which are adapted to effect control of output power by alternatively switching a plurality of switching elements connected in pairs, the push-pull connection or bridge connection are employed more often than not.

FIG. 3 is a schematic structural diagram illustrating a typical switching power source device of the conventional principle ("Power Semiconductor Circuits", pages 357-358, written by S. B. Dewan & A. Strengthen and published by John Wiley & Sons, 1975). FIG. 4 is a waveform diagram illustrating the operating principle of the power source device in FIG. 3.

A switch element 1 and filter means (composed of a choke coil 3 and a capacitor 4 which are connected in series with each other) are connected in series between the opposite terminals of a DC power source 5 which provides an output voltage with an unchanging, or constant, polarity as illustrated in FIG. 3. A load 6 is connected in parallel with capacitor 4. A diode D1 is connected in parallel with the series circuit of the choke coil 3 and the capacitor 4 in such a manner as to be reverse biased by power source 5. A junction node of the choke coil 3 and the capacitor 4 is connected to an output terminal 10.

During the operation, a rectangular wave voltage of modulated pulse width is generated at a node (junction point) 7 by alternately turning the switch element 1 on and off and regulating the time ratio of the alternate states.

When the time ratio of the ON-OFF states of the switch element 1 is controlled in the form of a sine wave as illustrated in FIG. 4 (a), for example, a rectangular wave voltage having a pulse width modulated as illustrated in the same figure is generated at the node 7 of the circuit of FIG. 3.

When this rectangular wave voltage has high-frequency components therein removed by means of the filter (LPF) composed of the choke coil 3 and the capacitor 4, a sine-wave pulsating output is produced at the output terminal 10 as illustrated in FIG. 4 (b) and is applied to the load 6.

A desired AC/DC output voltage is obtained by suitably varying the time ratio of the ON-OFF states of the switch element 1.

No problem would arise if the switch element 1 and the diode D1 were ideal switch elements and the signals for producing the alternate ON-OFF action of the switch were ideal rectangular waves. In the actual device, however, various problems occur whenever the switches are actuated because of the inherent characteristics of the switch elements. Now, these problems will be discussed below.

First, when the switch element 1 is on, an electric current flows to the load 6 through the circuit of power source 5, switch element 1 and choke coil 3. When the switch element is off, the load current continues to flow through the circuit of choke coil 3, load 6 and diode D1 because the load current flowing through the choke coil 3 does not immediately cease to exist.

When the switch element currently in the OFF-state is turned on again, the path for the electric current from the power source 5 would be switched safely to the choke coil 3 side if the diode D1 were instantaneously turned off by the reverse bias produced by the power source 5.

Actually, owing to the electric charges stored in the diode D1, however, the diode D1 is not instantaneously turned off by the application of the reverse bias and, as the result, the electric current flows for a brief period in the opposite direction. The brief period is called a storage time.

During the storage time, a surge current flows through the circuit of power source 5, switch element 1, diode D1 and back to power source 5 because the diode D1 is in a short-circuited state. The surge current causes such components as the switch element 1 to suffer power loss. The surge current renders it difficult to increase the switching frequency because such drawbacks as power loss, accumulation of heat in the switch element, and noise which are caused by the surge current are aggravated in proportion as the switching frequency is increased. Moreover, there is the possibility that the switch element will be destroyed when the surge current has an unduly large peak value.

It has been customary in the art to have such components as a reactor or a saturable reactor 81 connected in series to the switch element 1 and the diode D1 as illustrated in FIG. 5 (a) for the purpose of protecting the switch elements against the surge current and preventing the surge current from giving rise to current/voltage noise.

In this case, however, there arises the possibility that the energy stored in the reactor or the saturable reactor 81 during the storage time will give rise to a voltage surge during an interruption in the flow of electric current.

For the solution of said problem, it has been proposed to preclude the occurrence of the surge by connecting in parallel to the reactor 81, for example, a snubber circuit 80 composed of a resistor element and a diode as illustrated in FIG. 5 (b).

Even by this method, the surge cannot be prevented completely. Further, the charges stored in the reactor 81 are eventually consumed in the resistance of the snubber circuit 80. This method, therefore, fails to solve the problem of the aggravation of power loss and heat accumulation due to an increase in the switching frequency.

SUMMARY OF THE INVENTION

This invention which has been made to solve the problems mentioned above, aims to provide a switching power source capable of preventing the surge current/voltage likely to occur during the ON-OFF actions of a switch element by means of a reactor connected in series with the switch element which is likewise connected in series to an input constant polarity power source and, at the same time, capable of decreasing the power consumption due to the actuation of the switch element by the use of means enabling the energy stored in the surge-preventing reactor to be regenerated on the input power source side while the switch element is off.

This invention is characterized by the fact that a reactor for the prevention of surges is connected in series to a switch element which is likewise connected in series to an input power source. Bypass diodes, for enabling the energy stored in the surge-preventing reactor while the switch element is on to be regenerated on the input power source side while the switch element is off, are connected, respectively, between the opposite terminals of the surge-preventing reactor and one or the other of the terminals of the input power source in such a manner as to be reverse biased by the power source 5.

In the present invention, the surge current which occurs when the switch element shifts from the OFF-state to the ON-state can be decreased because the reactor for the prevention of surge is connected in series to the switch element which is likewise connected in series to the input power source.

Further, the energy stored at this time in the surge-preventing reactor can be fed back toward the input power source side by the regenerating diode when the switch element is turned off.

As the result, a current/voltage surge due to the ON-OFF actions of the switch element can be prevented and, at the same time, the aggravation of switching power loss and noise due to an increase in the switching frequency can be prevented.

DETAILED DESCRIPTION OF THE PREFERRED EMBODIMENTS

Figure 1:
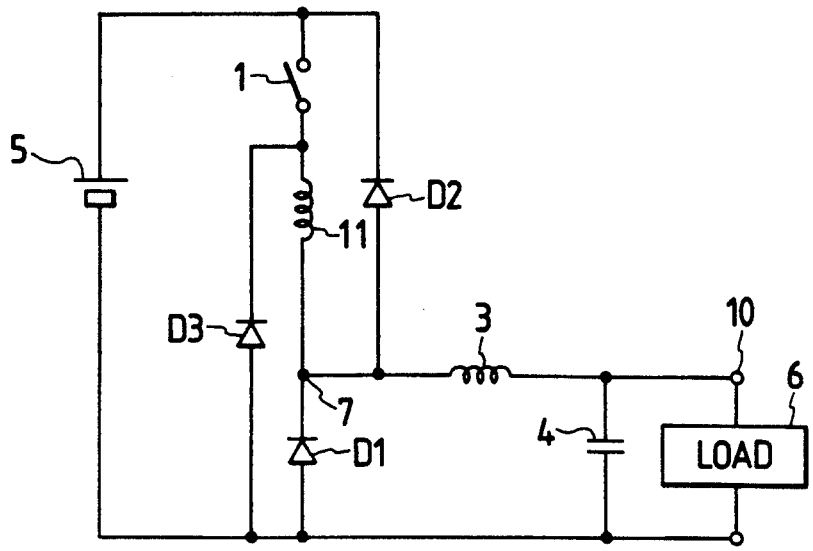
FIGS. 1 and 2 are each a circuit diagram illustrating an embodiment of the switching power source of the present invention.
Figure 3:
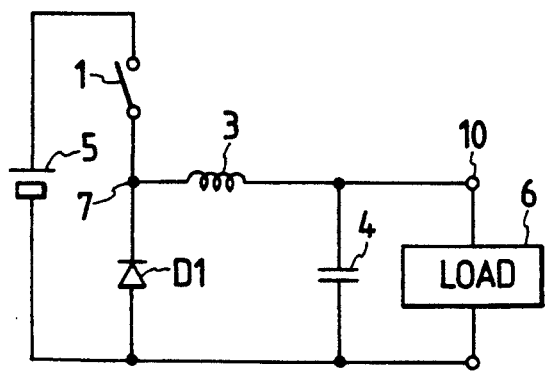
FIG. 3 is a circuit diagram illustrating a typical conventional switching power source.
Figure 4A:
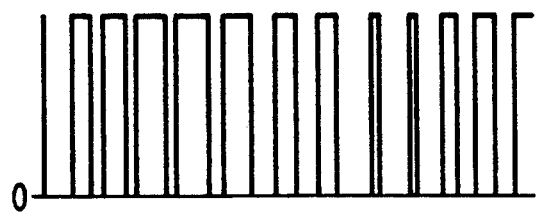
FIGS. 4A and 4B are waveform diagrams for the explanation of the operation of the conventional switching power source.
Figure 4B:
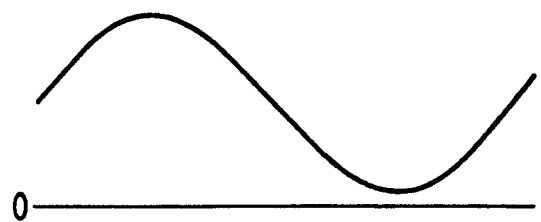
Figure 5A:
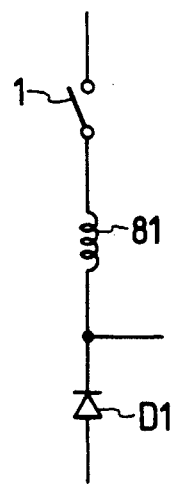
FIGS. 5A and 5B are circuits diagrams illustrating a typical conventional surge current/voltage preventing means.
Figure 5B:
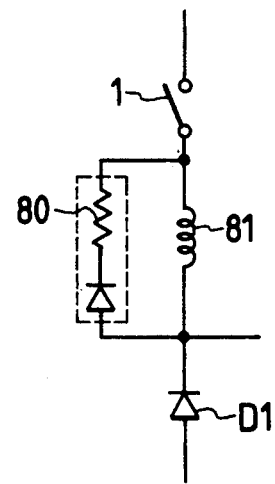

FIG. 1 is a circuit diagram of one embodiment of this invention. In the diagram, the same reference numerals as those in FIG. 3 denote identical or similar components.

A reactor 11 for the prevention of current/voltage surge is inserted in series between a switch element 1 and a diode D1 blocking current flow therefrom all connected in series across an input power source 5 which provides an output voltage having an unchanging, or constant, polarity. Diodes D2 and D3 are connected respectively between the opposite terminals of the reactor 11 and the opposite terminals of the power source 5.

More specifically, the diode D2 is connected between a connecting node 7, at the connection of the reactor 11 and the diode D1, and the positive terminal of the power source 7, and the diode D3 is connected between the connecting node, at the connection of the reactor 11 and the switch element 1, and the negative terminal of the power source 5, each being reverse biased by the power source 5.

Here, the threshold voltage selected for the diode D3 must be higher than that for the diode D1. Generally, the reactance value for the series reactor 11 is typically some tens of $\mu H$ and that for the choke coil for filter typically some hundreds of $\mu H$. Optionally, the diode D1 may have a switch element substituted therefor.

With reference to FIG. 1, first the electric current flows through the circuit of power source 5, switch element 1, reactor 11, choke coil 3, load 6 and back through power source 5 when the switch element 1 is on. Where the reactor 11 has stored energy therein by the time the switch element 1 is turned off, the electric current continues to flow to a load 6 through the path of reactor 11, choke coil 3, load 6, diode D3 and back through reactor 11. Even after the energy stored in the reactor 11 has ceased to exist, the electric current flowing through the choke coil 3 continues to flow because it makes no sudden change.

Here, the electric current continues to flow to the load 6 through the diode D1 and the choke coil 3 on the condition that the threshold voltage selected for the diode D3 is higher than that for the diode D1. The statement above holds also if the reactor 11 has stored no energy therein by the time the switch element 1 is turned off.

When the switch element 1 is turned on again, the diode D1 is not immediately switched off because of the storage time. As a result, there is formed a temporary circuit path through power source 5, switch element 1, reactor 11, diode D1, and through power source 5. In this case, however, the occurrence of a sharp surge current is eased because the reactor 11 is connected in series in the temporary circuit.

During the storage time, energy is accumulated in the reactor 11. When the diode D1 is turned off after the storage time while the switch element 1 is in the ON-state, the voltage surge due to the energy stored in the reactor 11 is decreased because a bypass circuit of diode D2 and switch element 1 is formed relative to the reactor 11.

When the switch element 1 is turned off, the energy stored as described above in the reactor 11 is fed back for regeneration to the power source 5 through the path of reactor 11, diode D2, power source 5, diode D3 and back through reactor 11.

In accordance with the present embodiment, therefore, the voltage surge and the current surge due to the ON-OFF actions of the switch element 1 are reduced. Further, since no power consumption is required for reducing the surge of voltage and current, the switching power loss and the noise can be lowered.

As a result, it is made possible to enhance the efficiency of the switching power source device and, at the same time, attain an increase in the switching frequency, decrease the sizes of such components as the transformer and the filter, and result in the power source device being relatively compact.

Figure 2:
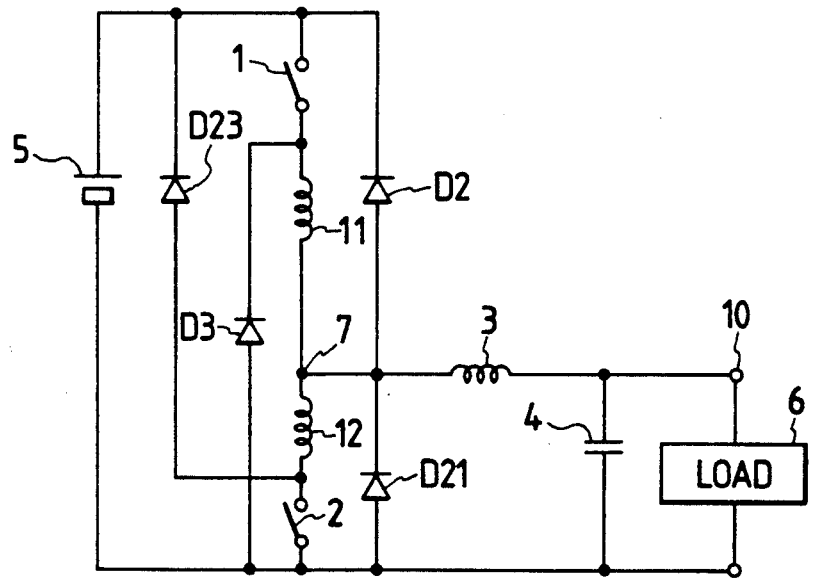

FIG. 2 is a circuit diagram illustrating another embodiment of this invention in a switching power source using a pair of switch elements. In this diagram, the same reference numerals as used in FIG. 1 denote identical or equivalent components.

Between the opposite, positive and negative, terminals of the input power source 5, a second switch element 2 and a second reactor 12 are connected in series with, and in addition to, the first switch element 1 and the first reactor 11. The series circuit of the choke coil 3 and the capacitor 4 is connected between the connecting node 7 for the pair of reactors 11 and 12 and the negative terminal of the input power source 5.

Between the connecting node 7 and each of the positive and negative terminals of the input power source 5, the diodes D2 and D21 are respectively connected in a reverse bias. The diodes D3 and D23 are connected in reverse bias, respectively, between the first connecting node, at the connection of the first switch element 1 and the first reactor 11, and the negative terminal of the input power source 5, and the second connecting node, at the connection of the second switch element 2 and the second reactor 12, and the positive terminal of the input power source 5.

During operation, the first and second switch elements 1 and 2 are actuated in mutually opposite phases so that one of them is turned on and the other off. While the first switch element 1 is on and the second switch element 2 off, the load current from the input power source 5 flows through the circuit of first switch element 1, first reactor 11, choke coil 3, load 6 and back through power source 5.

Conversely, when the first switch element 1 is off and the second switch element 2 on, the load current is caused to flow through the circuit of choke coil 3, load 6, second switch element 2, second reactor 12 and back through choke coil 3 by the energy stored in the choke coil 3.

The energy stored in the first reactor 11, while the first switch element 1 is on and the second switch element 2 is off, is fed back for regeneration to the power source 5 through the diodes D2 and D3 when the switch element 1 is turned off.

The energy stored in the second reactor 12, while the second switch element 2 is on and the first switch element 1 is off, is fed back for regeneration to the power source 5 through the diode D23 and D21 when the second switch element 2 is turned off.

In accordance with the present embodiment, as in the first embodiment, therefore, there is the effect of decreasing the voltage/current surge, the switching power loss, and the occurrence of noise.

Figure 6:
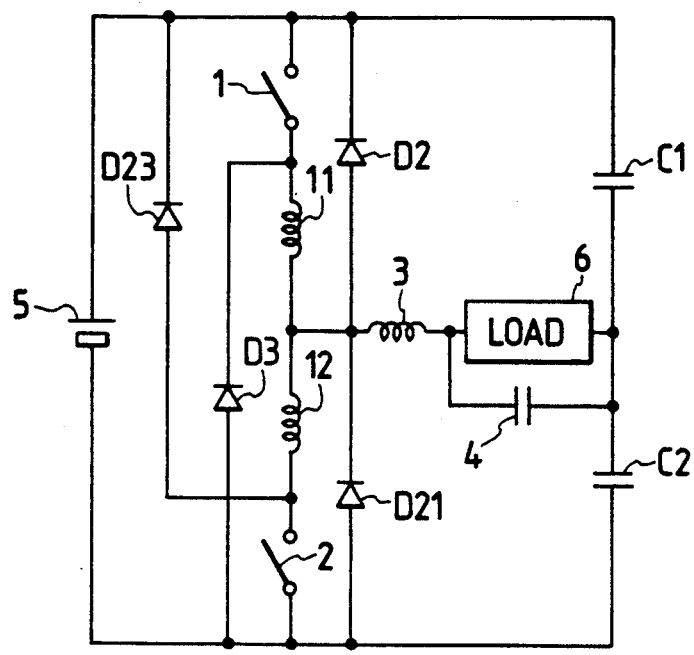
FIGS. 6 to 9 are circuit diagrams illustrating other embodiments of this invention.

FIG. 6 is a circuit diagram illustrating yet another embodiment of this invention in a half bridge type switching power source. In the diagrams, the same reference numerals as used in FIG. 2 denote identical or equivalent components.

A pair of capacitors C1 and C2 are connected in series with each other between the terminals of power source 5 and they are charged thereby and allowed to divide the voltage of the power source 5 into two halves. The first and second switch elements 1 and 2 are actuated in mutually opposite ON-OFF phases.

While the first switch element 1 is on and the second switch element 2 off, the electric current flows through the circuit of power source 5 with capacitor C1, first switch element 1, reactor 11, choke coil 3, load 6 and back through capacitor C2.

While the second switch element is on and the first switch element 1 off, the electric current flows through the circuit of capacitor C2, load 6, choke coil 3, reactor 12, second switch element 2 and back through capacitor C2.

The current surge which is otherwise generated when the first switch element 1 is turned on is prevented by the reactor 11. The voltage surge otherwise generated when the switch element 1 is turned off is prevented by causing the energy stored in the reactor 11 to be fed back for regeneration to the power source 5 by the diodes D2 and D3.

Similarly, the current surge otherwise generated when the second switch element 2 is turned on is prevented by the reactor 12, and the voltage surge otherwise generated when the switch element 2 is turned off is prevented by causing the energy stored in the reactor 12 to be fed back for regeneration to the power source 5 by the diodes D23 and D21.

Figure 7:
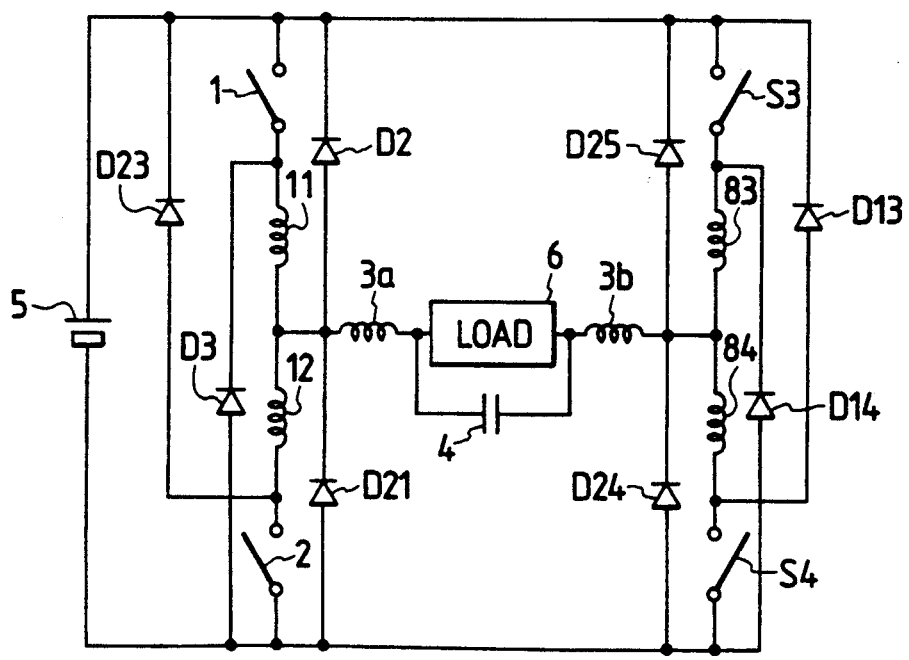

FIG. 7 is a circuit diagram illustrating still another embodiment of this invention in a full-bridge type switching power source. In this diagram, the same reference numerals as used in FIG. 6 denote identical or equivalent components.

The first switch element 1 and a fourth switch element S4 form one pair and the second switch element 2 and a third switch element S3 form another pair. These two pairs of switch elements are actuated in mutually opposite ON-OFF phases.

While the first and fourth switch elements 1 and S4 are on and the second and third switch elements 2 and S3 are off, the electric current flows through the circuit of power source 5, switch element 1, reactor 11, choke coil 3a, load 6, choke coil 3b, reactor 84, switch element S4 and back through power source 5.

Conversely, while the second and third switch elements 2 and S3 are on and the first and fourth switch elements 1 and S4 are off, the electric current flows through the circuit of power source 5, switch element S3, reactor 83, choke coil 3b, load 6, choke coil 3a, reactor 12, switch element 2 and back through power source 5.

The current surge otherwise generated when the first and fourth switch elements 1 and S4 are turned on is prevented by the reactors 11 and 84. The voltage surge otherwise generated when these switch elements 1 and S4 are turned off is prevented by causing the energy stored in the reactor 11 and the energy stored in the reactor 84 to be fed back for regeneration to the power source 5, by the diodes D2 and D3 and by the diodes D13 and D24, respectively.

Similarly, the current surge otherwise generated when the second and third switch elements 2 and S3 are turned on is prevented by the reactors 12 and 83. The voltage surge otherwise generated when these switch elements 2 and S3 are turned off prevented by causing the energy stored in the reactor 12 and the energy stored in the reactor 83 to be fed back for regeneration to the power source 5, by the diodes D23 and D21 and by the diodes D25 and D14, respectively. In the present embodiment, either of the reactors 11 or 84 or either of the reactors 12 or 83 may be omitted, or one from both pairs may be omitted.

Figure 8:
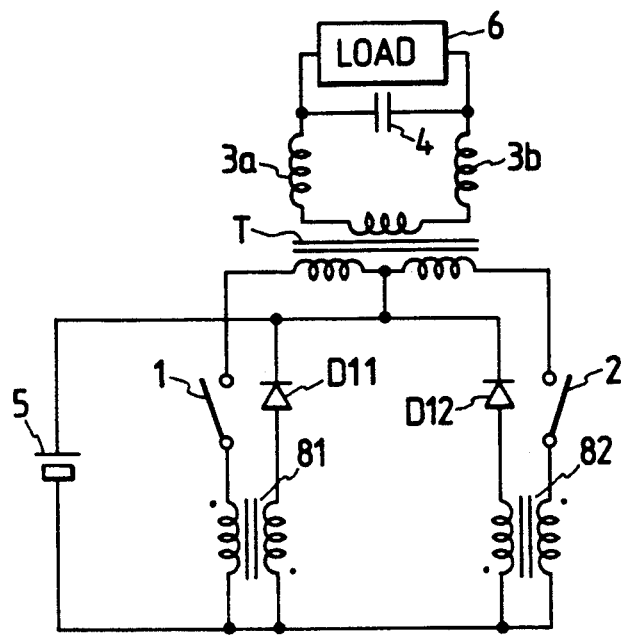

FIG. 8 is a circuit diagram illustrating a further embodiment of this invention in a push-pull type switching power source. In this diagram, the same reference numerals as used in FIG. 2 denote identical or equivalent components.

With reference to FIG. 8, the positive terminal of the input power source 5 is connected to the center point of the primary winding of an output transformer T. One of the terminals of the primary winding of the output transformer T is connected to the negative terminal of the input power source 5 through the first switch element 1 and the primary winding of a first reactor 81, and the other terminal of the primary winding of the transformer T is connected to the negative terminal of the input power source 5 through the second switch element 2 and the primary winding of a second reactor 82.

The secondary windings of the first and second reactors 81 and 82 are each connected in series with a corresponding one of the diodes D11 and D12 between the opposite terminals of the input power source 5. The diodes D11 and D12 are connected to be reverse biased by the power source 5. The load 6 is connected to the secondary winding of the output transformer T. Optionally in the present embodiment, the switch elements 1 and 2 may be interchangeable in position with interchangeable in the respective one of reactors 81 and 82 in its series combination therewith.

During operation, the first switch element 1 and the second switch element 2 are actuated in mutually opposite ON-OFF phases so that one of the switch elements is on while the other is off.

While the first switch element 1 is on and the second switch element 2 is off, the load current from the input power source 5 flows through the circuit of the left half part of the primary winding of the output transformer T, first switch element 1, first reactor 81 (primary side) and back through power source 5.

Conversely, when the first switch element 1 is off and the second switch element 2 is on, the load current from the input power source 5 flows through the circuit of the right half of the primary winding of the output transformer T, second switch element 2, second reactor 82 (primary side) and back through power source 5.

As a result, an alternating current is obtained on the secondary side of the output transformer T and is fed to the load 6.

The current surge otherwise generated when the first switch element 1 is turned on is prevented by the reactor 81 (primary side). The voltage surge otherwise generated when this switch element 1 is turned off is prevented by causing the energy stored in the reactor 81 to be fed back for regeneration to the power source 5 by the diode D11.

Similarly, the current surge otherwise generated when the second switch element is turned on is prevented by the reactor 82 (primary side). The voltage surge otherwise generated when the switch element 2 is turned off is prevented by causing the energy stored in the reactor 82 to be fed back for regeneration to the power source 5 by the diode D12.

Similar to any of the embodiments described above, there is an effect of decreasing the voltage or current surge, switching power loss, and noise.

Figure 9:
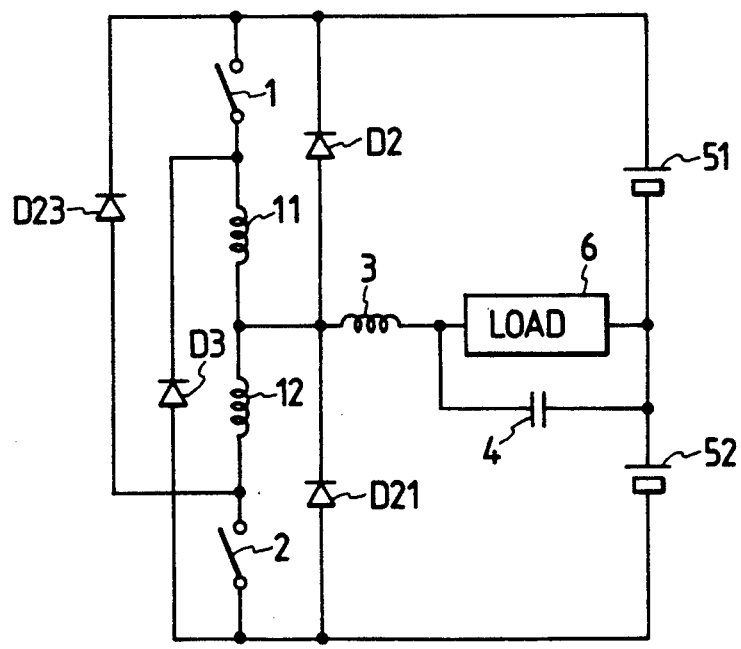

FIG. 9 is a circuit diagram illustrating still a further embodiment of the present invention in a half bridge type switching power source where the same reference numerals as used in FIG. 6 denote identical components. This embodiment is the same as the one shown in FIG. 6 except that input power source 5 and a pair of capacitors C1 and C2 in FIG. 6 have substituted for them a pair of power sources 51 and 52 connected in series. The connecting node of the pair of power sources 51 and 52 is connected to a terminal of each of the load 6 and the smoothing capacitor 4. It is self-evident that the operation of this embodiment is same as one of FIG. 6.

The parts usable as switch elements in the present invention include diodes, bipolar transistors, thyristors, field effect transistors (FET), and gate turn off (GTO) thyristors, for example.

EFFECT OF THE INVENTION

It is evident from the description given above that, in accordance with this invention, the current surge liable to occur during the ON-OFF actions of the switch elements is decreased by a simple means of inserting reactors between switch elements and an input power source. The voltage surge liable to occur when the switch elements are turned off is prevented by having connected between the opposite terminals of the reactors and the positive and negative terminals of the input power source the diodes which are adapted to enable the energy, stored while the switch elements are on, to be fed back for regeneration of the input power source when the switch elements are turned off.

Since this invention reduces the power consumption due to the actuation of the switch elements, the power can be utilized in improved efficiency, the switching frequency of the switch elements can be increased, such components such as the smoothing choke coil, capacitor, and output transformer can be decreased in size and weight, and the response to control of the output voltage can be made more rapidly so much so as to permit fine regulation of the output voltage.

Further, the circuit elements are allowed to be made more compact and endowed with enhanced reliability of performance because the surge current is curbed. Such peripheral components as the heat radiator are allowed to be more compact because the electric current flowing through the circuit elements is decreased, and the noise filter can be omitted or simplified because the occurrence of noise is diminished.

What is claimed is:

1. A switching power source comprising:
 a pair of output terminals suited for electrical connection to a load means, and a pair of input terminals suited for electrical connection to a constant polarity electrical power source;
 a first switch element, a reactor and filter means which are electrically connected with each other in series between one of the input terminals and one of the output terminals;
 a second switch element electrically connected between the other input terminal and both the reactor and the filter means; and
 means for causing energy stored in the reactor to be fed back to said constant polarity electrical power source electrically connected to the pair of input terminals for regeneration thereof when the first and second switch elements are in the OFF state, with the first switch element to be switched between ON and OFF states so as to have selected ratios of time in each.

2. A switching power source according to claim 1, wherein the second switch element is a diode so connected as to be reverse biased by said constant polarity electrical power source electrically connected to the input terminals.

3. A switching power source according to claim 1, which further comprises means for electrically connecting that input terminal connected to the second switching element to the other of the output terminals.

4. A switching power source according to claim 2, which further comprises means for electrically connecting that input terminal connected to the second switching element to the other of the output terminals.

5. A switching power source according to claim 1, wherein said means for enabling the energy stored in the reactor to be fed back for regeneration comprises a pair of diodes which are connected between either side of said reactor and a corresponding one of said pair of input terminals in such a manner as to each be reverse biased by said constant polarity electrical power source electrically connected to the input terminals.

6. A switching power source comprising:
a pair of output terminals suited for electrical connection to a load means, and a pair of input terminals suited for electrical connection to a constant polarity electrical power source;
a first switch element, a first reactor and filter means which are electrically connected with each other in series between one of the input terminals and one of the output terminals;
a second switch element and a second reactor electrically connected with each other in series between the other input terminal and both the first reactor and the filter means; and
means for causing energy stored in at least one of the first and second reactors to be fed back to said constant polarity electrical power source electrically connected to the pair of input terminals for regeneration thereof when at least one of the first and second switch elements is in the OFF state,
with the first and second switch elements to be switched between ON and OFF states so as to have selected ratios of time in each such that each of the switch elements switches to the state opposite that of the other.

7. A switching power source according to claim 6, which further comprises means for electrically connecting that input terminal connected to the series connection of the second switch element and the second reactor to the other of the output terminals.

8. A switching power source according to claim 6, wherein there is further provided a neutral point terminal also adapted for electrical connection to such a constant polarity electrical power source, and the neutral point terminal is connected to the other output terminal.

9. A switching power source comprising:
first and second output terminals suited for electrical connection to a load means, and first and second input terminals suited for electrical connection to a constant polarity electrical power source;
a first switch element, a first reactor and a first filter means which are electrically connected with each other in series between the first input terminal and the first output terminal;
a second switch element and a second reactor electrically connected with each other in series between the second input terminal and both the first reactor and the first filter means;
a third switch element, a third reactor and a second filter means electrically connected with each other in series between the first input terminal and the second output terminal;
a fourth switch element and a fourth reactor electrically connected with each other in series between the second input terminal and both the third reactor and the second filter means; and
means for causing energy stored in at least one of the first, second, third and fourth reactors to be fed back to said constant polarity electrical power source electrically connected between the first and second input terminals for regeneration thereof when at least one of the first, second, third and fourth switch elements is in the OFF state,
with the first, second, third and fourth switch elements to be switched between ON and OFF states so as to have selected ratios of time in each such that the first and third switch elements switch to the state opposite that to which the second and fourth switch elements are switched.

10. A switching power source according to claim 9, wherein the means for causing the energy stored in at least one of the first, second, third and fourth reactors to be fed back for regeneration comprises a pair of diodes which are electrically connected between either side of at least one of the reactors and a corresponding one of said first and second input terminals in such a manner as to each be reverse biased by said constant polarity electrical power source electrically connected to the first and second input terminals.

11. A switching power source comprising:
an output transformer provided with a primary winding having a center tap and a secondary winding with the center tap of the primary winding electrically connected to one of a pair of input terminals suited for electrical connection to a constant polarity electrical power source;
a first reactor and a first switch element electrically connected with each other in series between the other input terminal and one side of the primary winding;
a second reactor and a second switch element electrically connected with each other in series between the other input terminal and the other side of the primary winding;
a filter means electrically connected between the secondary winding and a pair of output terminals suited for electrical connection to a load means; and
means for causing energy stored in at least one of the first and second reactors to be fed back to said constant polarity electrical power source electrically connected between the pair of input terminals for regeneration thereof when at least one of the first and second switch elements is in the OFF state,
with the first and second switch elements to be switched between ON and OFF states so as to have selected ratios of time in each such that each of the switch elements switches to the state opposite that of the other.

* * * * *